United States Patent
Butler et al.

[15] 3,637,299
[45] Jan. 25, 1972

[54] OPTICAL PRINTER
[72] Inventors: Lawrence W. Butler, 6180 Lumple Hill Road, Los Angeles, Calif. 90028; Roger Banks, Hollywood, Calif.
[73] Assignee: said Butler, by said Banks
[22] Filed: Aug. 17, 1970
[21] Appl. No.: 64,547

[52] U.S. Cl. ............................................................. 352/85
[51] Int. Cl. ..................................................... G03b 21/32
[58] Field of Search ..................... 352/85, 89, 90, 86, 87, 88, 352/91

[56] References Cited

UNITED STATES PATENTS 2,004,992  6/1935  Koenekamp ............................ 352/89

Primary Examiner—Donald O. Woodiel
Attorney—Lindenberg, Freilich & Wasserman

[57] ABSTRACT

An optical printer has a camera and several projectors driven by stepping motors. Provision is made to control these motors so that they may be driven in synchronization or the projector motors may be driven out of synchronization and independently of the camera drive. Provision is also made to insure that the motors always stop in a predetermined home position, get up to full speed after rotating through a predetermined arc and begin to slow down with a predetermined arc of the home position.

10 Claims, 8 Drawing Figures

INVENTORS
LAWRENCE W. BUTLER
ROGER BANKS
BY

ATTORNEYS

INVENTORS
LAWRENCE W. BUTLER
ROGER BANKS

OPTICAL PRINTER

BACKGROUND OF THE INVENTION

This invention relates to optical printers employed in motion picture production and, more particularly, to improvements therein.

Optical printers are used for producing motion picture special effects. They usually comprise two or more film image projectors and a motion picture camera which are placed so that the illuminated film image of the two projectors are superimposed and recorded by the camera. Not only is the optical printer employed for superimposition of two film images, but many other trick effects are obtained with it, such as by running the camera at normal speed while holding the projector stationary or advancing it one frame at a time or at a much slower rate of speed than the camera is operated. Image superimposition is used for titling films for obtaining special background effects, and also for split image effects.

It will be appreciated that the shutter and film drives of the camera and projectors of the aerial image optical printer must be driven in such a way that besides running together, startup and stopping locations must be maintained substantially identical. This precision is required for synchronous operation or for asynchronous operation where single frames at a time are being exposed to the camera. Heretofore, a single motor has been used as the drive power source. This motor drives a shaft form which drive power is taken for the various projectors and camera by means of mechanical driven shafts. As a result, the required substantially instantaneous startup and stopping of the system was accompanied by much noise and vibration of the system. In order to maintain the accuracy of the stopping locations as well as synchronous acceleration and deceleration of the system, a large amount of preventive maintenance was required.

OBJECTS AND SUMMARY OF THE INVENTION

An object of this invention is the provision of a novel and improved drive system for an optical image printer.

Yet another object of the invention is the provision of a drive system for an optical image printer which eliminates vibration and noise and substantially reduces the requirement for preventive maintenance.

Yet another object of the present invention is the provision of a novel and useful control system for the drive system of an optical image printer.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
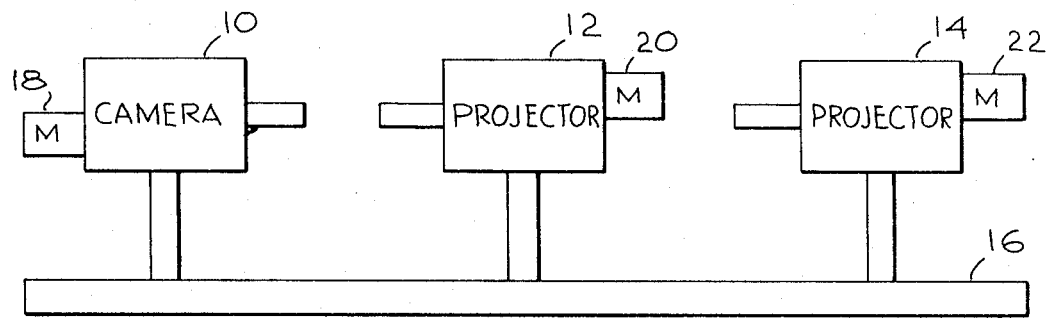
FIG. 1 is a simplified drawing of an optical image printer.

Referring now to FIG. 1 there is shown a simplified drawing of a projector for the purpose of providing a better appreciation of this invention. The camera 10, projector 12 and projector 14 are mounted and optically aligned on the top of a rather substantial box 16. The projector 14 is sometimes called an aerial projector. The film reels for the camera and the two projectors are omitted in the interest of simplification. Heretofore, a box 16 would hold a very large motor which would drive a power shaft. Along the length of the power shaft there would be mounted arrangements to afford power takeoff to a number of flexible drive shafts. These mechanical drive shafts would be coupled to the film drives and to the shutter drive of the camera and the projectors.

In a system of this sort, it will be appreciated that for synchronous operation of the camera and the projectors, the three shutters must be driven in a manner so that they open and close substantially simultaneously, and the film in the camera and the projectors must be transported so that each frame on each film is simultaneously present in the shutter opening for the same length of time. Also, for out of sync operation, such as where it is desired to take skip frame pictures, shutter and film drive must occur synchronously and with precision.

Heretofore, the answer to the requirements of the adequate operation of the optical image printer was to use an oversize motor to drive the main shaft. Besides being expensive, the sudden acceleration and deceleration required for frame at a time photography cause vibration and noise with consequent maintenance problems in order to insure correct operation.

In accordance with this invention, there is provided at the respective camera 10, projector 12 and projector 14, stepping motors respectively 18, 20 and 22. The three motors and their associated electronics, besides costing much less than the single oversize motor and its associated tuning and drive apparatus, provide quiet and vibration free operation and also reduce the maintenance requirements considerably. In addition, the motors are mounted right at the location where they are needed, as a result of which the drive shaft and mechanical shaft coupling are illuminated together with their mechanical losses.

The stepping motor enables one to measure accurately the amount of arc through which the motor rotates since the motor is advanced in response to changes in excitation applied to its field windings. While the substitution of individual motors in place of the single motor may seen like an obvious expedient, the problems created for obtaining a performance out of the three motors which equalled and/or bettered that obtained by the single motor operation were difficult to overcome and required some rather unique solutions.

Figure 2:
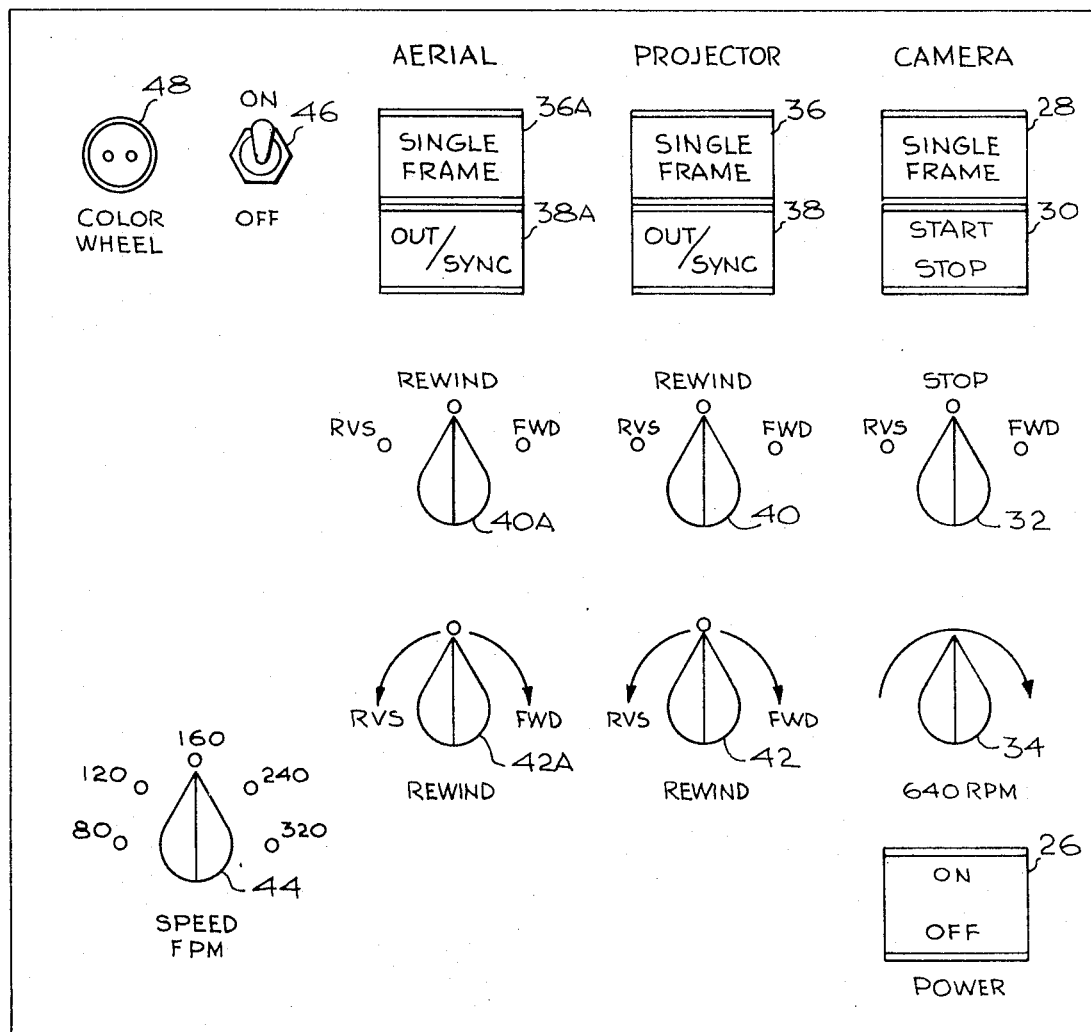
FIG. 2 is a drawing of a control panel for an optical image printer in accordance with this invention.

Reference is now made to FIG. 2 which shows the control panel for an optical image printer in accordance with this invention. The control panel is shown to illustrate the kinds of operation required for the printer.

The control panel has an on/off switch 26, which turns power on. There is a set of controls for the camera, for the projector, and for the aerial projector. The camera has a pushbutton 28 labeled single frame, which when actuated causes the camera to expose a single film frame. Another pushbutton 30 designated as start/stop, is pushed when it is desired that the camera run continuously and is pushed again in order to stop the camera.

A selector switch 32, provides a forward running function for the camera, a stop function, and a reverse running function for the camera.

The base speed for the operation of the camera and the projectors is stated in terms of frames per minute (f.p.m.). The selector switch 44 establishes the base speed. The range of speeds available with this invention are 80 f.p.m., 120 f.p.m., 160 f.p.m., 240 f.p.m. and 320 f.p.m. Also, the camera can be operated from above 360 f.p.m. up to 640 f.p.m. by operating the potentiometer 34, which gives an infinitely variable speed between 360 and 640 f.p.m.

The projector also has a single frame pushbutton 36, and a pushbutton 38, designated as OUT/SYNC. This button is pushed when it is desired to operate the projector out of synchronization with the operation of the camera. Otherwise, when the start button of the camera is operated, both projectors will operate synchronously with the camera.

A selector switch 40 is actuated in order to provide forward running, reverse running and rewind functions for the projector. A potentiometer 42 is actuated to one side or the other of center. It determines the speed of the rewind operation either going in the reverse direction or in a forward direction.

The aerial projector has the same set of controls as the projector. These therefore, are given the same reference numerals followed by the letter A.

If synchronous pulses are desired with the rotation of the camera motor, a switch 46 is actuated. This enables excitation of a plug 48 designated as "color wheel."

Figure 3:
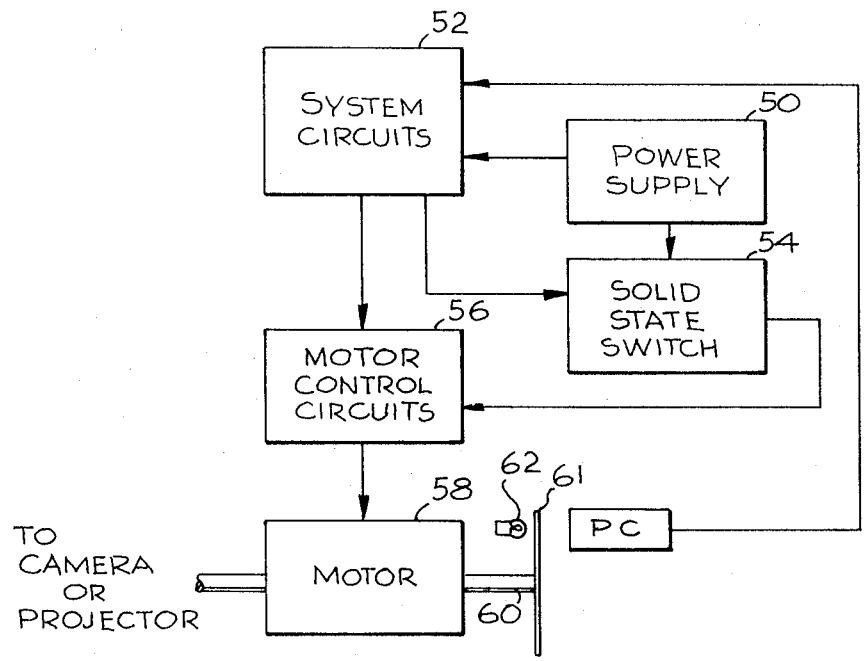
FIG. 3 is a block diagram schematically illustrating the motor and photocell arrangement employed in the embodiment of the invention.

FIG. 3 is a simplified block diagram illustrative of the arrangement for controlling any one of the three motors which are employed. A power supply 50 supplies energy to the system circuits 52, which, in response to the switches actuated on the control panel operate to provide signals both to a solid-state switch 54 and to the motor control circuits 56. The signals applied to the motor control 56 by the system circuits are pulsed signals which direct the motor to rotate at a desired speed and in one direction or the other. The signal applied to the solid state switch is one which causes it to open or close whereby the required exciting current for the motor is applied or withheld. The motor 58 is maintained in the standby condition with both exciting current and pulses withheld in order to minimize motor loss.

Mounted on the motor shaft 60 is a vane 61, shown in more detail in FIG. 4. The vane 61 is rotated by the motor shaft and functions to enable light from a source 62 to shine or not on one or more photocells 64. The output from the photocells is applied back to the system circuits 52, and serve to accurately position the motor at a homing position and also to indicate when the motor should be accelerated or decelerated.

Figure 4A:
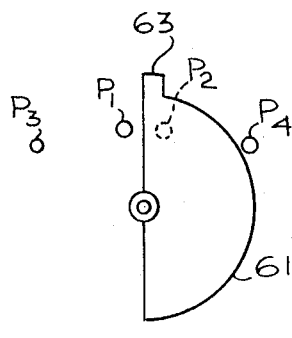
FIGS. 4A, 4B, and 4C illustrate the photocell and vane arrangements employed in the embodiment of the invention.

Referring now to FIG. 4, there may be seen the camera vane position for homing as well as the photocell positions. In FIG. 4A, the vane 61 is shown in the home position. This is the position in which photocell P2 is covered and photocell P1 is uncovered so that it receives light. Photocell 3 produces a pulse output when the tab 63, on the end of the vane passes thereby, and photocell P4 produces a pulse output when the tab 63 passes it. These photocells P3 and P4 respectively indicate end accelerate and start decelerate locations for the motor.

Figure 4B:
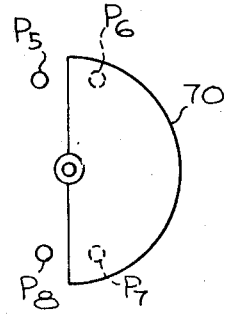
Figure 4C:
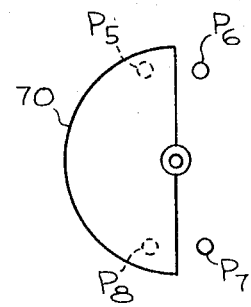

FIG. 4B shows the projector vane 70 (one for each projector). The position shown is the one assumed when the projector is in the sync position. The photocells P5 and P6 are employed. Their locations relative to the vane are the same as photocells P1 and P2, shown in FIG. 4A. Thus, the projector vane position is the same as a camera vane position in the home position when the projector is in sync with the camera. When the projector is out of sync with the camera, then photocells P7 and P8 are in circuit and photocells P5 and P6 are not. The position assumed by the vane 70 is that shown in FIG. 4C where photocell P7 is covered or blocked from the light and photocell P8 is exposed.

Figure 5:
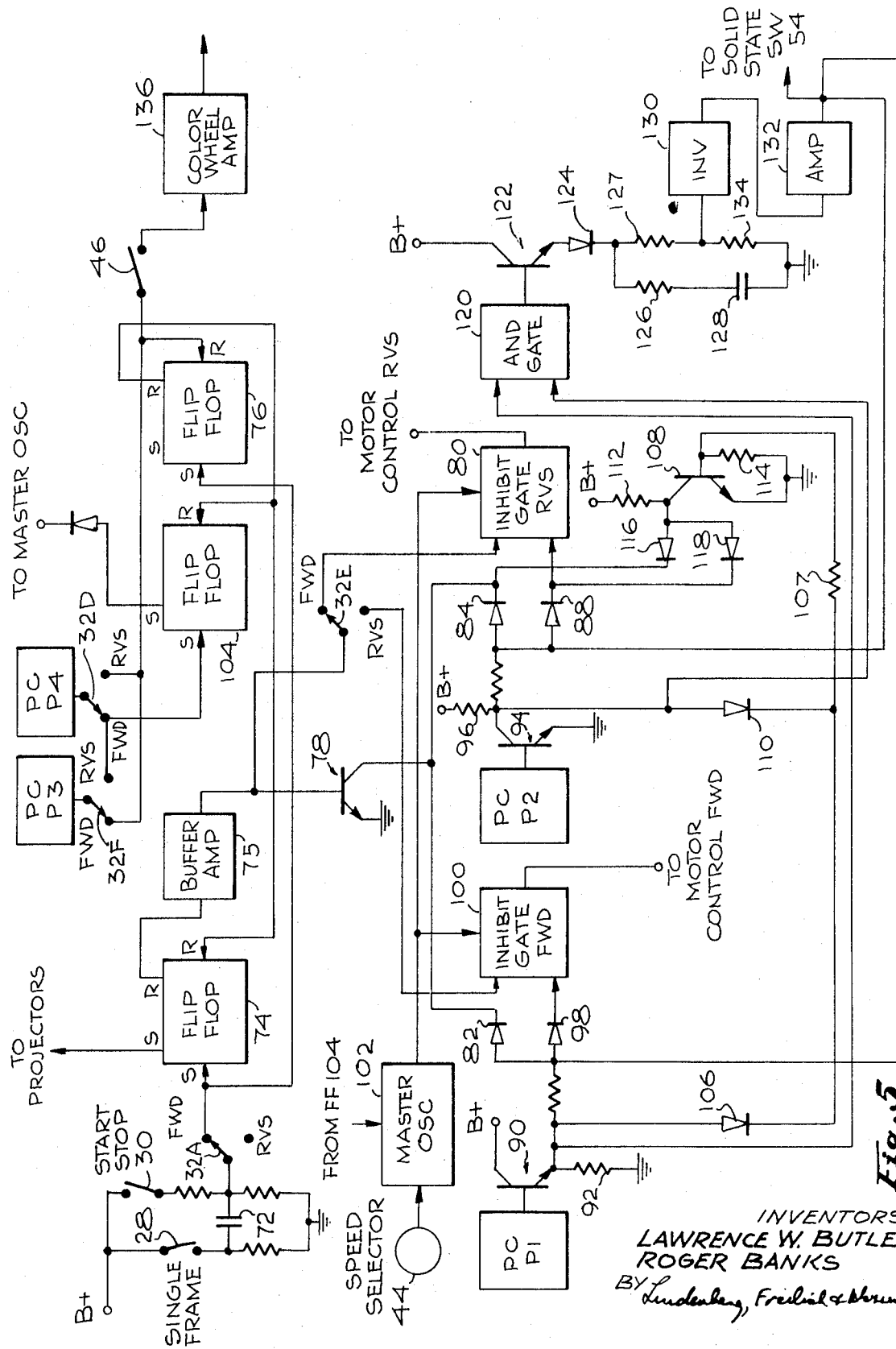
FIG. 5 is a block schematic diagram of the camera control circuits in accordance with this invention.

FIG. 5 is a block schematic diagram of the control circuit for the camera motor. The switches shown are given the same reference numerals as are shown in FIG. 2. It is to be noted that each of these selector switches such as switch 32, has many levels, respectively designated as 32A, through 32F. It will be understood that these are all gauged together and operate together. The switch 28, which provides single frame operation of the camera, when closed applies a signal through a capacitor 72 to a flip-flop 74, through switch 32A, causing it to be driven to its set state. This flip-flop applies a synchronizing signal to all projectors. The pulse which sets flip-flop 74 is also applied to flip-flop 76 driving it to its set state.

When flip-flop 74 is driven to its set state its reset side goes high and this causes a buffer amplifier 75 to apply an inhibit input to switch 32E. With the switch setting shown this applies an inhibit signal to gate 80 (reverse). A transistor 78 is also enabled by the buffer amplifier, 75, whereby diodes 82 and 84 are connected to ground and this shunts any signals which may be generated by photocells P1 and P2 and prevents these from inhibiting the inhibit gates 80, 100. The arrangement described blocks operation of the inhibit gates 80, 100, by the photocells P1 and P2 as long as flip-flop 74 is in its set state.

This is the normal running condition. It is not desired that the "homing" photocells affect the operation of the system until just before they are needed.

Diode 82 has its anode connected to the anode of a diode 98. Diode 84 has its anode connected to the anode of a diode 88.

The output of photocell P1 is applied to the base of a transistor 90, whose collector is connected to B+ and whose emitter is connected through a resistor 92 to ground. Thus, the transistor is maintained conductive whereby a voltage exists across resistor 92, so long as light shines on photocell P1. Photocell P2 is connected to the base of a transistor 94. The collector of transistor 94 is connected through a resistor 96 to B+ and its emitter is connected to ground.

Now under the condition assumed, that is, a single frame forward operation, the tab 63 first passes photocell P4. The output of the photocell P4 is applied over switch 32D to set flip-flop 104. When the tab 63 passes over photocell P3, it momentarily interrupts output from photocell P3, whereby a reset pulse is delivered to flip-flop 76. In being reset, flip-flop 76 resets flip-flops 104 and 74. This has the effect of removing the additional voltage form the master oscillator whereby the motor will begin to decelerate. It also removes the inhibiting signals provided to the inhibit gate through the switch 32E as well as the enabling signal to the lockout transistor 78. This has the effect of enabling photocell control of the motor whereby it may be restored to its home position. The emitter of transistor 90, is connected through a diode 106 and a resistor 107, to the base of a transistor 108. The collector of transistor 94 is connected through a diode 110 and the resistor 107 to the base of transistor 108. The collector of transistor 108 is connected through a resistor 112 to B+. The emitter of transistor 108 is connected to ground. The base of transistor 108 is connected through a resistor 114 to ground. The collector of transistor 108 is connected through the two respective diodes 116 and 118, respectively to the anodes of diodes 84 and 88. A diode 98 is connected from the emitter of transistor 90 to the forward inhibit gate 100 and diode 88 (and also 118) are connected to the reverse inhibit gate 80. In the presence of an input signal through any of these diodes the inhibit gates are prevented from allowing pulses from the master oscillator to be applied to the motor control system.

Now that transistor 78 has been turned off and the inhibiting signal from the reset output of the flip-flop 74 has been removed, photocells P1 and P2 can, with their outputs, inhibit the respective inhibit gates 80, 100. Whichever one is inhibited, the other uninhibited one will pass signals from the master oscillator to the motor. The way the photocells P1 and P2 control the homing of the motor after the transistor 78 has been turned off is as follows. Assume first that P1 and P2 photocells are covered. Under these circumstances, neither photocell produces an output signal. Therefore, since the collector of transistor 94 is high, it, through diode 110, can bias on transistor 108. The collector of transistor 94 also applies an inhibiting signal to the reverse inhibit gate 80. Forward inhibit gate 100 is not receiving any inhibiting signals and can pass pulses from the master oscillator to the motor control to cause the motor to turn in a forward direction.

Assume both photocells are uncovered and therefore are producing output signals. Transistor 108 is conductive, as are the transistors 92 and 94. The emitter of transistor 92 applies an inhibit signal to the forward inhibit gate 100, however, the reverse inhibit gate is able to apply signals received from the master oscillator to the motor control to cause the motor to move in a reverse direction.

Assume photocell P2 is exposed and thus produces an output signal and photocell P1 is not exposed and does not produce an output signal. Transistor 108 is nonconductive and the voltage from B' through resistor 12 is applied to inhibit the reverse gate 80. The forward gate 100 does not receive any inhibiting signals and therefore the pulses from the master oscillator can pass therethrough to drive the motor in a forward direction.

Finally, now assume the photocell P1 is uncovered and photocell P2 is not, corresponding to the homing position. Transistor 108 is conductive, however, the potential at the collector of photocell 94 which is nonconductive is applied to inhibit the reverse gate 80. The transistor 90 is conductive and the potential from its emitter is applied to inhibit the forward gate. Accordingly, the motor will be stopped.

It is desired to open the solid-state switch 54 to prevent motor current when the home position is reached. This operation is accomplished by an AND-gate 120 which senses when transistor 90 is conductive and transistor 94 is nonconductive. The output of the AND gate enables a transistor 122 to become conductive. Transistor 122 has its collector connected to B+ and its emitter connected to a diode 124. The diode is connected through a resistor 126 to an inverter 130, a capacitor 128 and through a resistor 127.

When transistor 122 is rendered conductive, it immediately applies a signal to the inverter 130. It also charges up capacitor 128. This insures that if the signal rendering transistor 122 conductive is terminated, a delay interval occurs before the inverter 130 can become inoperative. Inverter 130 drives an amplifier 132, whose output is applied to the solid state switch 54 to render it inoperative and also is applied back to the respective diodes 98 and 88 to maintain the forward and reverse inhibit gates turned off.

The reason for the time delay provided by the capacitor 128 is to prevent system and motor inertia from causing the motors to coast through a stop position.

In the previous discussion, the operation of the system was described for a single frame occurring in response to depressing switch 28. For a continuous operation, switch 30 is closed and maintained closed for as long as the operation is required after which it is opened. This insures that flip-flop 74 remains set as well as flip-flop 76 and in turn flip-flop 104, despite any turn off signals received from photocells 3 or 4.

An amplifier 136 provides the color wheel output pulses which are derived from photocell P3 through switch 46, or P4, depending on the turning direction.

At this time, if desired, any one of the stepping motors may be turned by hand through a desired arc, without affecting the rest of the system. Amplifier 132 output blocks the output from the photocells during this time from affecting the system. This arrangement is necessary to enable loading of the camera and projector heads.

Figure 6:
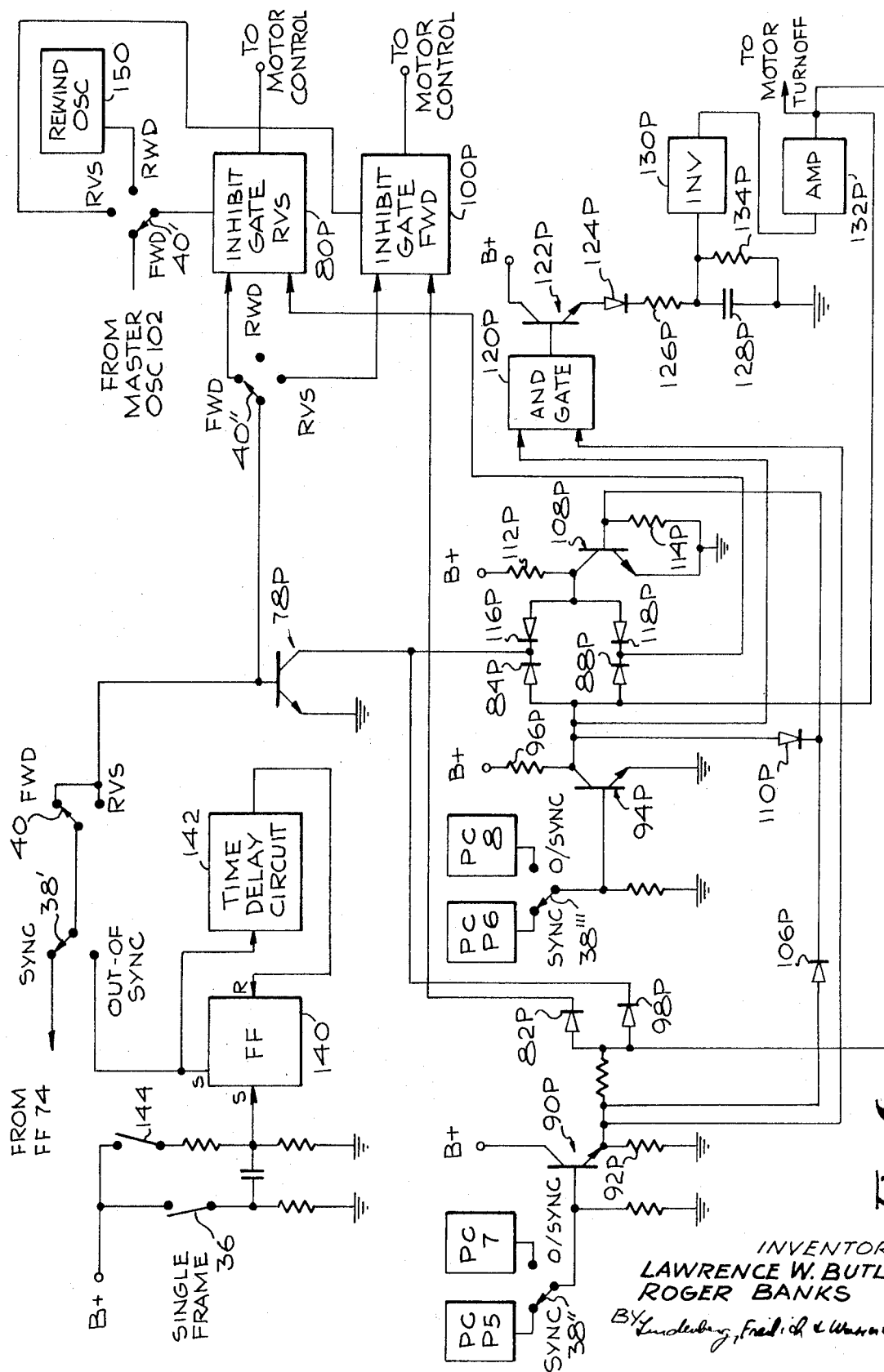
FIG. 6 is a block schematic diagram of the projector control circuits employed with the embodiment of the invention.

FIG. 6 shows a block schematic of the circuitry required for the projector. The circuitry required for the aerial projector and/or other projectors is identical. The switches shown in FIG. 6 which corresponds to those on the front panel shown in FIG. 2 are given the same reference numerals. Each different deck of a switch is given a different prime number. The sync/out-of-sync switch 38' is connected to the forward reverse switch 40. With these switches in the position shown, the signal from flip-flop 74 provides sync information, telling the projector motor when it should start and when it should begin to decelerate. The remaining circuitry required for the operation of the motor including the homing circuitry is identical with that shown for the camera. Thus, the circuitry will be given the same reference numeral as the camera circuits except that they will be distinguished by having the letter P for projector applied thereto. Accordingly, no further explanation of this circuitry is required, except to emphasize that in the sync mode of operation, camera and projector start together and stop together and are operated by pulses form the master oscillator. It should be noted that photocells P5 and P6 shown in FIG. 4 and again in FIG. 6 correspond to photocells 1 and 2 for the camera and operate to bring the system to the home position. Photocells 7 and 8 are called into operation when it is desired to have an out-of-sync operation with a different home position for the motor. The same circuitry is used however, for both operations.

For the out-of-sync operation, switches are shifted to the out-of-sync position. When the single frame switch 36 is operated, it drives a flip-flop 140. Flip-flop 140 delivers a starting pulse over the switch 38' and switch 40 to the following circuitry. This following circuitry operates identically as does the circuitry for driving the camera in its single frame mode. Flip-flop 140 drives a time delay circuit 142 which, after an interval, determined as the time required for the motor to rotate three-quarters of a cycle, applies an output to reset flip-flop 140. At this time the photocells P5 and P6 take over and home the motor. For continuous operation in the out-of-sync mode of the projector, a switch 144 is employed.

The rewind oscillator output is applied to either the forward or the reverse inhibit gate as determined by the locations of the switch 40'. Switch 144 is operated when the rewind mode of operation is desired.

While the invention has been described with two optical projectors, it will be appreciated that this is by way of illustration and should not be considered as a limitation on the system. Three or more projectors may be employed using the principles of the invention which have been described.

There has accordingly been described and claimed hereinabove a novel, useful and improved aerial optical projection system.

What is claimed is:

1. In an optical image printer system of the type wherein a camera is mounted to photograph images projected thereon by one or more projectors, the improvement comprising:
   a separate motor for said camera and for each projector;
   switch means for selecting synchronous or asynchronous operation of said camera and projector motors;
   means for initiating simultaneous start up of said camera and projector motors during synchronous operation;
   homing means for bringing each of said motors to a home position;
   lockout means for each of said motors for maintaining said homing means for bringing each of said motors to a home position inoperative; and
   means responsive to said camera motor attaining a predetermined position prior to said home position for rendering said lockout means inoperative whereby all of said motors are brought to their home positions by their homing means.

2. In a system as recited in claim 1 wherein there is included:
   master oscillator means for driving said motor;
   an auxiliary potential source having a value which when applied to said master oscillator means insures that said motors will be driven at a desired operating speed in response thereto;
   means responsive to said camera motor attaining a first predetermined position after start up for applying potential from said auxiliary source to said oscillator means; and
   means responsive to said camera motor attaining a second predetermined position prior to said home position for terminating the application of potential from said auxiliary source to said oscillator.

3. In a system as recited in claim 1 wherein said homing means includes for each motor a vane mounted on the shaft of a motor for being rotatable therewith, each vane extending for a portion of the area of the circle described by said vane when it is rotated;
   a light source positioned on one side of said vane;
   a first and a second photocell means positioned relative to said vane and light source to be sequentially exposed and blocked from said light source as said vane rotates; and
   circuit means responsive to outputs from said first and second photocell means to enable said motor to rotate until said first photocell is exposed to said light source and said second photocell is blocked therefrom.

4. In a system as recited in claim 3 wherein said circuit means includes a first, second and third transistor, each having emitter, collector and base electrodes;
   means connecting said first photocell means output to the base of said first transistor;

first resistance means having one end connected to said first transistor emitter;

means connecting said second photocell output to the base of said second transistor;

second resistance means having one end connected to said second transistor collector;

diode means coupling said first transistor emitter and said second transistor collector to said third transistor base;

third resistance means having one end connected to said third transistor collector;

a source of operating potential;

means for applying operating potential from said source to said first, second and third resistance means other ends and to said first transistor collector, said second transistor emitter and said third transistor emitter;

first gate means which when not inhibited enables its associated motor to turn in a one direction;

second gate means which when not inhibited enables its associated motor to turn in a direction opposite to said one direction;

first means connecting said first transistor emitter to said first gate means for inhibiting said first gate means when said first transistor is rendered conductive by output from said first photocell means;

second means connecting said second transistor collector to said second gate means for inhibiting said second gate means when said second transistor is not rendered conductive by the absence of output from said second photocell means; and third means connecting said third transistor collector to said second gate means for inhibiting said second gate means when said third transistor is not rendered conductive by either said first transistor being rendered conductive or said second transistor not being conductive.

5. In a system as recited in claim 2 wherein said means responsive to said camera motor attaining a first predetermined position after start up for applying potential from said auxiliary source to said oscillator means includes:

a vane mounted on said camera motor shaft to be rotatable therewith, said vane having a tab extending from the outer periphery;

a light source on one side of said vane;

a first photocell means positioned at said first predetermined position at the other side of said vane at a location at which the tab on said vane will interrupt the light from said source to said first photocell; and switch means operated responsive to the interruption of output from said first photocell means for connecting potential from said auxiliary potential source to said master oscillator means;

said means responsive to said camera motor attaining a second predetermined position includes:

a second photocell means positioned at said second predetermined position at the other side of said vane at a location at which the tab on said vane will interrupt the light from said source to said second photocell; and means responsive to the interruption of output from said second photocell means for rendering said switch means inoperative.

6. In an optical image printer of the type having a camera positioned for photographing the images projected from one or more projection heads, the improvement comprising:

a separate motor for actuating said camera and each of said projection heads;

switch means for affording synchronous or asynchronous operation of said camera and projection head actuating motors;

a master oscillator means for providing output pulses for driving said motors when applied thereto;

a forward gate means for each motor for applying pulses from said master oscillator when not inhibited to said motor to cause said motor to rotate in a forward direction;

a reverse gate means for each motor for applying pulses from said master oscillator when not inhibited to said motor to cause said motor to rotate in a reverse direction;

photocell means for each motor having a predetermined location adjacent said motor for establishing a predetermined home position for said motor;

means for each motor driven by said motor for causing its photocell means to assume a predetermined operative and nonoperative pattern;

circuit means responsive to said photocell means not having said predetermined pattern for inhibiting one of said forward and reverse gate means and for inhibiting both of said forward and reverse gate means when said photocell means has said predetermined pattern; and lockout means for each motor for blocking the response of said forward and reverse gate means to said photocell means until said motor reaches a predetermined location prior to said home position.

7. In an optical image printer as recited in claim 6 wherein there is included an auxiliary oscillator means for providing output pulses for driving said motors when applied thereto, and switch means for applying auxiliary oscillator pulses to a reverse gate means when a rewind operation is desired.

8. In an optical image printer as recited in claim 6 wherein said photocell means includes a first and second photocell;

said circuit means includes a first, second and third transistor, each having emitter, collector and base electrodes;

means connecting said first photocell means output to the base of said first transistor;

first resistance means having one end connected to said first transistor emitter;

means connecting said second photocell output to the base of said second transistor;

second resistance means having one end connected to said second transistor collector;

diode means coupling said first transistor emitter and said second transistor collector collector to said third transistor base;

third resistance means having one end connected to said third transistor collector;

a source of operating potential;

means for applying operating potential form said source to said first, second and third resistance means other ends and to said first transistor collector, said second transistor emitter and said third transistor emitter;

first means connecting said first transistor emitter to said forward gate means for inhibiting said forward gate means when said first transistor is rendered conductive by output from said first photocell means;

second means connecting said second transistor collector to said reverse gate means for inhibiting said reverse gate means when said second transistor is not rendered conductive by the absence of output from said second photocell means; and third means connecting said third transistor collector to said reverse gate means for inhibiting said reverse gate means when said third transistor is not rendered conductive by either said first transistor being rendered conductive or said second transistor not being conductive.

9. In an optical image printer as recited in claim 6 wherein there is included an auxiliary potential source having a value which when applied to said master oscillator means insures that said motors will be driven at a desired operating speed in response thereto, includes:

a vane mounted on said camera motor shaft to be rotatable therewith, said vane having a tab extending from the outer periphery;

a light source on one side of said vane;

a third photocell means positioned at said first predetermined position at the other side of said vane at a location at which the tab on said vane will interrupt the light from said source to said first photocell; and switch means operated responsive to the interruption of output from said third photocell means for connecting potential from said auxiliary potential source to said master oscillator means;

said means responsive to said camera motor attaining a second predetermined position includes:

a fourth photocell means positioned at said second predetermined position at the other side of said vane at a location at which the tab on said vane will interrupt the light from said source to said second photocell; and means responsive to the interruption of output from said fourth photocell means for rendering said switch means inoperative.

10. In an optical image printer as recited in claim 8 wherein said lockout means for blocking the response of said forward and reverse gate means includes a fourth transistor having base, collector and emitter electrodes;

diode means connecting said fourth transistor collector to said first photocell means emitter and second photocell means collector;

means connecting said fourth transistor collector to said source of operating potential; and means for applying an enabling signal to said fourth transistor base when it is desired to operate a motor other than in a homing mode.

* * * * *